US012661893B2

(12) United States Patent
Terasaki

(10) Patent No.: US 12,661,893 B2
(45) Date of Patent: Jun. 23, 2026

(54) LAMINATED SUBSTRATE, LIQUID EJECTION HEAD, AND METHOD OF MANUFACTURING LAMINATED SUBSTRATE

(71) Applicant: CANON KABUSHIKI KAISHA, Tokyo (JP)

(72) Inventor: Atsunori Terasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/498,227

(22) Filed: Oct. 31, 2023

(65) Prior Publication Data

US 2024/0181778 A1 Jun. 6, 2024

(30) Foreign Application Priority Data

Dec. 6, 2022 (JP) ................................ 2022-194826

(51) Int. Cl.
*B41J 2/16* (2006.01)
*B41J 2/14* (2006.01)

(52) U.S. Cl.
CPC ........... *B41J 2/1623* (2013.01); *B41J 2/1609* (2013.01); *B41J 2/14209* (2013.01); *B41J 2202/03* (2013.01); *B41J 2202/22* (2013.01)

(58) Field of Classification Search
CPC .... B41J 2/1623; B41J 2/1609; B41J 2/14209; B41J 2202/03; B41J 2202/22
See application file for complete search history.

(56) References Cited

U.S. PATENT DOCUMENTS

| | | | | |
|---|---|---|---|---|
| 5,041,847 A * | 8/1991 | Matsumoto | B41J 2/3353 | 347/205 |
| 2010/0109023 A1* | 5/2010 | Yonehara | H10H 20/018 | 438/458 |
| 2018/0345666 A1* | 12/2018 | Hayashi | B41J 2/1626 | |

FOREIGN PATENT DOCUMENTS

JP 2008-100382 A 5/2008

* cited by examiner

*Primary Examiner* — Jason S Uhlenhake
(74) *Attorney, Agent, or Firm* — Venable LLP

(57) ABSTRACT

An object is to provide a laminated substrate, a liquid ejection head, and a method of manufacturing a laminated substrate which are capable of preventing a decrease in the yield of a manufacturing process due to the substrate getting broken and an organic resin material sticking out. To that end, a structure including an eave portion having an overhang with a predetermined length is provided on a predetermined surface of a first substrate so as to form a space between the structure and the predetermined surface, and a resin is filled in the space.

11 Claims, 11 Drawing Sheets

FIG.7A1
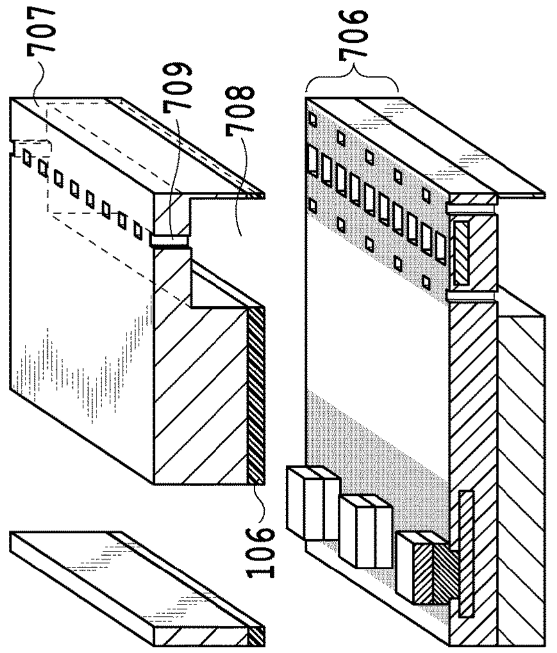
FIG.7A2
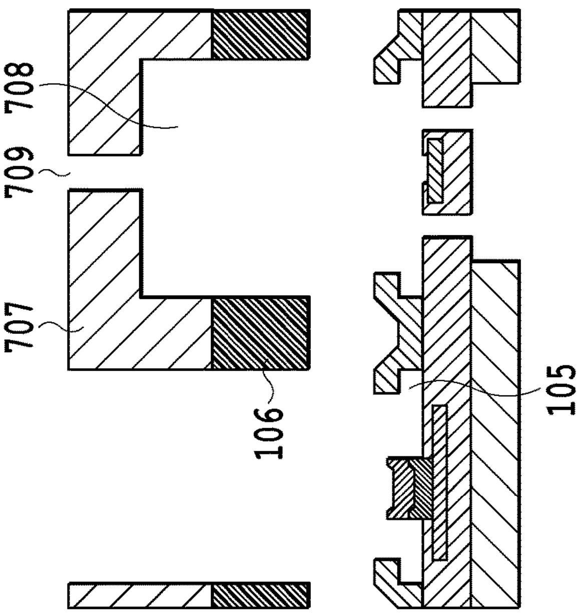
FIG.7B1
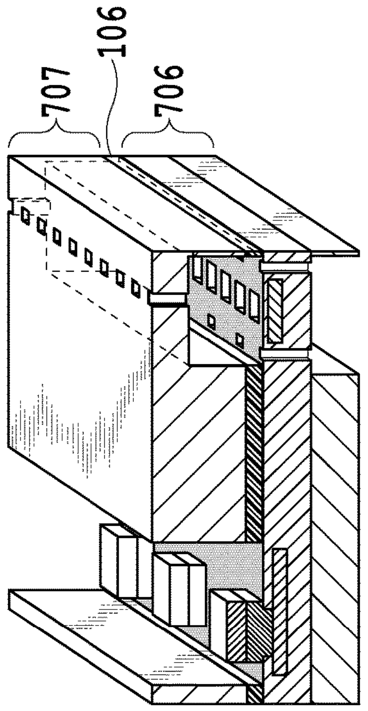
FIG.7B2
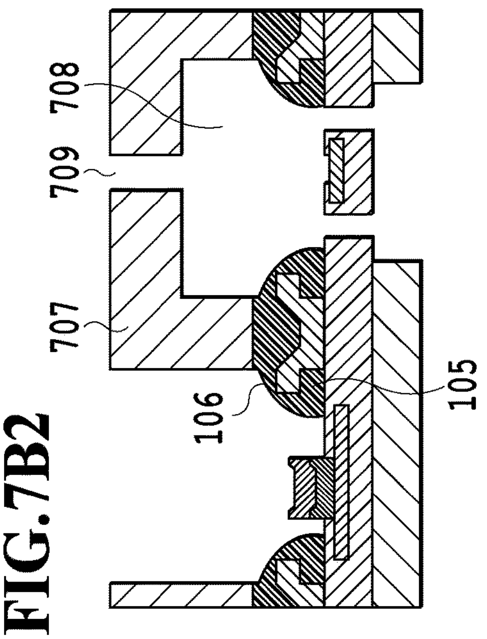

LAMINATED SUBSTRATE, LIQUID EJECTION HEAD, AND METHOD OF MANUFACTURING LAMINATED SUBSTRATE

BACKGROUND OF THE INVENTION

Field of the Invention

The present invention relates to a laminated substrate formed by laminating members, a liquid ejection head using that laminated substrate, and a method of manufacturing the laminated substrate.

Description of the Related Art

In liquid ejection heads subjected to general micro electromechanical systems (MEMS) processing, channel forming members form channels on a silicon substrate. Since the channels are three-dimensionally connected in a complicated manner, they are sometimes formed by forming patterns in multiple substrates and joining the substrates. A bonding method using an organic resin material or the like is preferably used as a method of joining the substrates. Specifically, a layer of the organic resin material is formed on at least one side of each substrate to be bonded. Then, the substrates are oriented to face each other and brought into close contact with each other with the organic resin material therebetween, and the organic resin material is cured. As a result, a joined body is obtained.

Before the curing, a pressure is sometimes applied to the substrates to even the organic resin material. Applying a pressure may cause the organic resin material to stick out of the substrates. This leads to a possibility that the organic resin material sticking out closes some channels, for example.

Also, depending on the organic resin material used, the organic resin material may flow out even in a state where it is applied to either substrate. In this case too, there is a possibility of closing some channels.

Japanese Patent Laid-Open No. 2008-100382 discloses a method in which part of a surface of a substrate to be joined is removed to form clearance grooves, and an organic resin material is filled in the clearance grooves to prevent the organic resin material from flowing out.

With the method of Japanese Patent Laid-Open No. 2008-100382, however, the strength of the substrate may drop due to the removal of part of the substrate surface to form the grooves. This leads to a possibility of breaking the substrate in the manufacturing process. This in turn leads to a possibility of decreasing the yield of the manufacturing process due to the breakage of the substrate. Moreover, in a case where the substrate includes device structures such as wirings, the clearance grooves cannot be provided to cross those device structures. Thus, there are various constraints in forming the clearance grooves. Accordingly, there is a possibility of failing to achieve optimization through filling of the organic resin material, and decreasing the yield due to the organic resin material sticking out.

SUMMARY OF THE INVENTION

In view of the above, the present invention provides a laminated substrate, a liquid ejection head, and a method of manufacturing a laminated substrate which are capable of preventing a decrease in the yield of a manufacturing process due to the substrate getting broken and an organic resin material sticking out.

A laminated substrate is a laminated substrate in which a resin is applied to a predetermined surface of a first substrate, in which a structure including an eave portion having an overhang with a predetermined length is provided on the surface so as to form a space between the structure and the surface, and the resin is filled in at least part of the space.

According to the present invention, it is possible to provide a laminated substrate, a liquid ejection head, and a method of manufacturing a laminated substrate which are capable of preventing a decrease in the yield of a manufacturing process due to the substrate getting broken and an organic resin material sticking out.

Further features of the present invention will become apparent from the following description of exemplary embodiments with reference to the attached drawings.

BRIEF DESCRIPTION OF THE DRAWINGS

FIG. 7A1 is a view illustrating the method of manufacturing a liquid ejection head in a step-by-step order;

FIG. 7A2 is a view illustrating the method of manufacturing a liquid ejection head in a step-by-step order;

FIG. 7B1 is a view illustrating the method of manufacturing a liquid ejection head in a step-by-step order;

FIG. 7B2 is a view illustrating the method of manufacturing a liquid ejection head in a step-by-step order;

DESCRIPTION OF THE EMBODIMENTS

First Embodiment

A first embodiment of the present invention will be described below with reference to drawings.

Figure 1A:
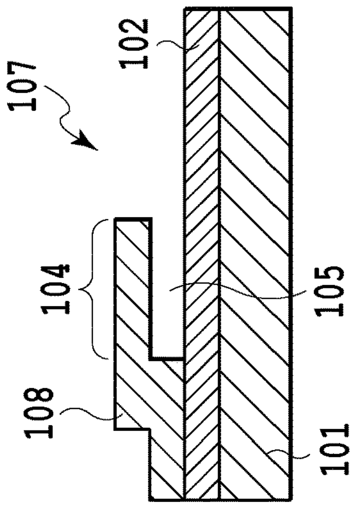
FIG. 1A is a view illustrating a first substrate, a surface material, and a structure having an eave portion.
Figure 1B:
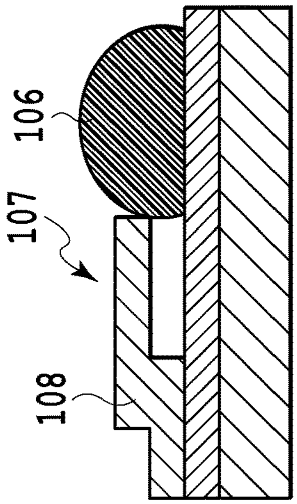
FIG. 1B is a view illustrating the first substrate, the surface material, and the structure having the eave portion.
Figure 1C:
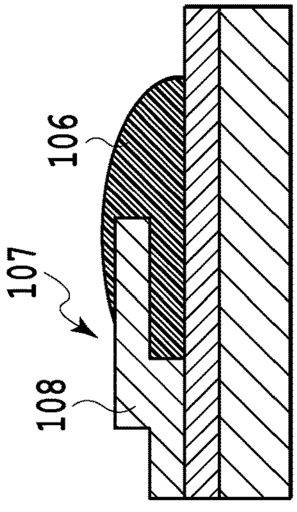
FIG. 1C is a view illustrating the first substrate, the surface material, and the structure having the eave portion.

FIGS. 1A to 1C are views illustrating a first substrate 101, a surface material 102 laminated on the first substrate 101, and a structure 108 having an eave portion 104. FIGS. 1A to 1C are views sequentially illustrating how an organic resin material 106 gets under the eave portion 104 of the structure 108. Here, the eave portion refers to a portion having an overhang with a predetermined length and having a space under the overhang.

In the present embodiment, as illustrated in FIG. 1A, the structure 108 having the eave portion 104 is provided on a joining surface 109 of the surface material 102 laminated on the first substrate 101, and the organic resin material 106 is filled in a space 105 under the eave portion 104 of the structure 108. The first substrate 101 with the surface material 102 and the structure 108 provided thereon will be hereinafter referred to as "joining substrate 107". After the organic resin material 106 is applied to the vicinity of the structure 108 in the joining substrate 107 as illustrated in FIG. 1B, the organic resin material 106 gets drawn into the space 105 under the eave portion 104 mainly by a capillary force as illustrated in FIG. 1C. The organic resin material 106 thus drawn in is held between the eave portion 104 and the surface material 102 by the capillary force. As the organic resin material 106 gets drawn into the structure 108 by the capillary force, the area of contact between the organic resin material 106 and the surface of the structure 108 increases, so that the surface free energy on the surface of the structure 108 acts on the organic resin material 106 as well. The surface free energy on the surface of the structure 108 also acts so as to hold the organic resin material 106. The effect of the surface free energy varies depending on the viscosity of the organic resin material 106 and its affinity to the surface of the structure 108, and is high in a case where the viscosity is high and the affinity is good.

Figure 2A:
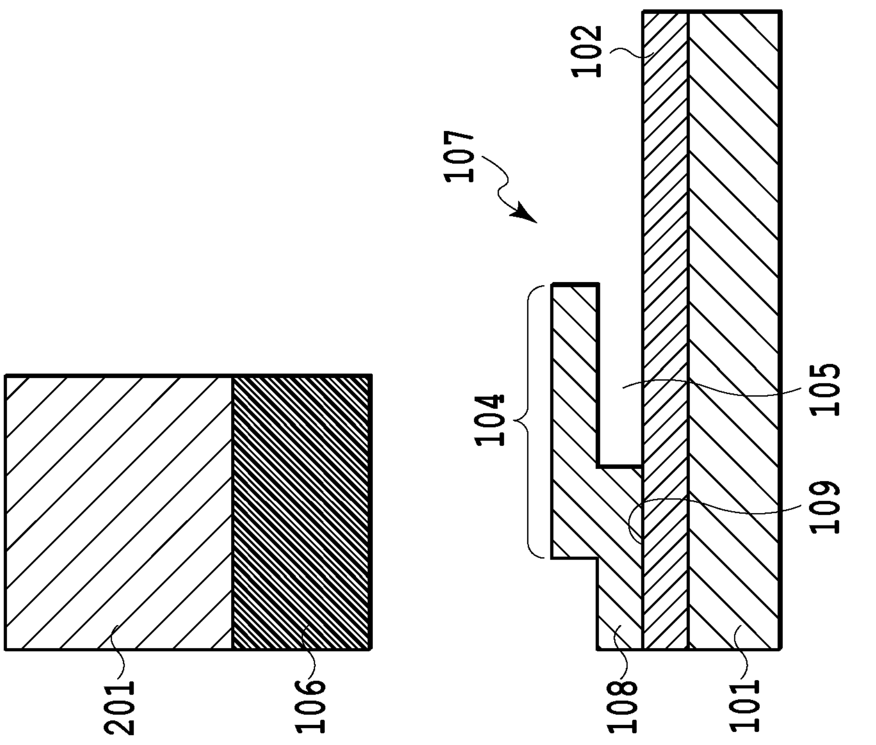
FIG. 2A is a view illustrating a joining substrate and a second substrate before being joined.
Figure 2B:
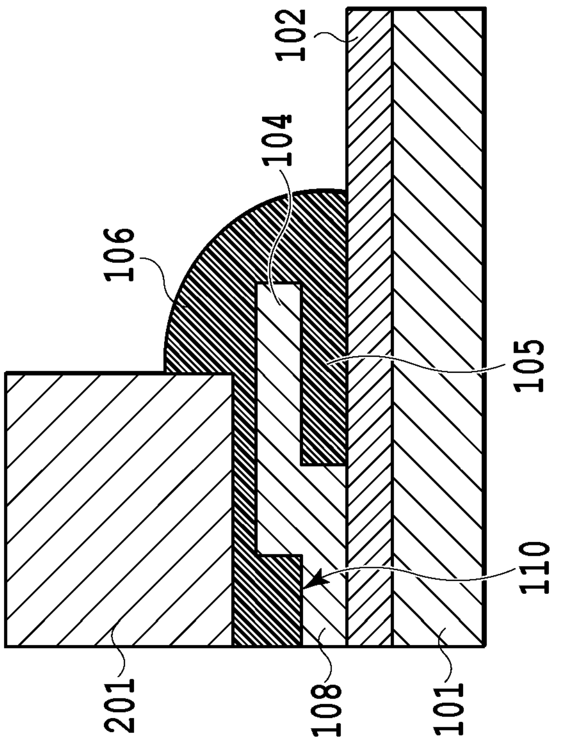
FIG. 2B is a view illustrating the joining substrate and the second substrate after being joined.

FIG. 2A is a view illustrating the joining substrate 107 and a second substrate 201 before being joined. FIG. 2B is a view illustrating the joining substrate 107 and the second substrate 201 after being joined. As illustrated in FIG. 2A, the second substrate 201 with a layer of the organic resin material 106 formed thereon is pressed against the joining surface 109 of the joining substrate 107 to join them. As the second substrate 201 is pressed against the joining substrate 107, the organic resin material 106 sticks out of a joining portion 110 between the joining substrate 107 and the second substrate 201 as illustrated in FIG. 2B. However, the part of the organic resin material 106 thus sticking out gets into and held in the space 105 under the eave portion 104 by a capillary force on the structure 108, which is provided on the surface of the joining substrate 107 facing the second substrate 201.

With the structure 108 and the organic resin material 106 contacting each other, the surface free energy on the surface of the structure 108 acts, thereby increasing the holing power to hold the organic resin material 106. In other words, forming the structure 108 enables a capillary force and a surface free energy to act on the organic resin material 106. As a result, the organic resin material 106 is held. In this way, it is possible to prevent the organic resin material 106 from spreading widely after the joining as compared to a case without the eave portion 104.

Figure 3A:
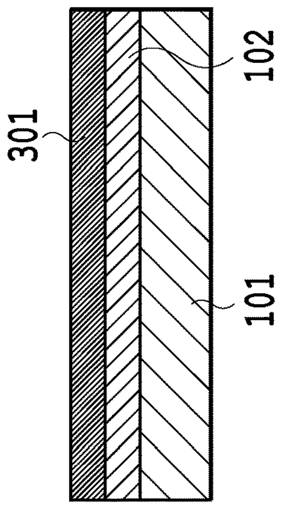
FIG. 3A is a view illustrating a process of manufacturing the joining substrate in a step-by-step order.

FIGS. 3A to 3E are views illustrating a process of manufacturing the joining substrate 107 in a step-by-step order. FIG. 4 is a view illustrating a comparative example in which anisotropic dry etching is used. The process of manufacturing the joining substrate 107 will be described below in a step-by-step order. First, as illustrated in FIG. 3A, a film of a material 301 is formed on the surface material 102 on the first substrate 101. Possible examples of the surface material 102 on the substrate include Si-based materials such as Si, SiN, SiC, SiO, SiOC, SiON, SiCN, and SiOCN since typical semiconductor devices and MEMS devices are expected targets. Other possible examples include Al, Cu, Au, Ir, and Ta, which are electrode materials and the like. In the case of a liquid ejection head, TiO, TaO, HfO, and ZrO, which are used for ink-resistant films, and the like are also possible candidates. Two or more of these kinds of materials may be present on the substrate surface instead of only one kind.

At least the same material as the material 102 can be a candidate of a material 103 for forming the eave portion 104. In particular, in the case of a liquid ejection head, an ink-resistant film is desirably disposed on the joining surface, and SiC, SiOC, SiCN, SiOCN, TiO, TaO, HfO, ZrO, or the like can be preferably selected. This material 103 may also function to improve the adhesion to the organic resin material 106. In particular, SiC is a good example of that material.

Figure 3B:
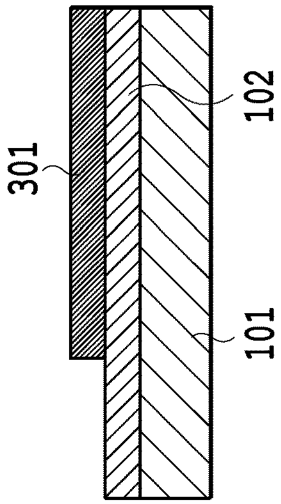
FIG. 3B is a view illustrating the process of manufacturing the joining substrate in a step-by-step order.
Figure 3C:
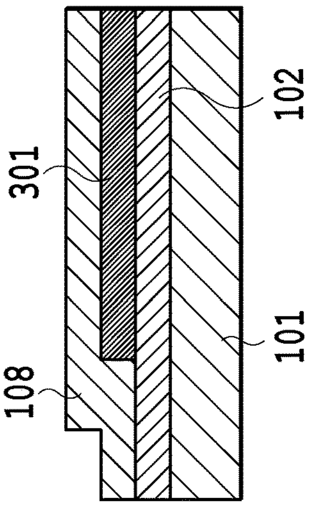
FIG. 3C is a view illustrating the process of manufacturing the joining substrate in a step-by-step order.
Figure 3D:
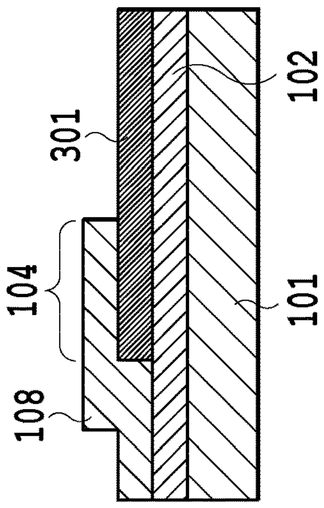
FIG. 3D is a view illustrating the process of manufacturing the joining substrate in a step-by-step order.
Figure 3E:
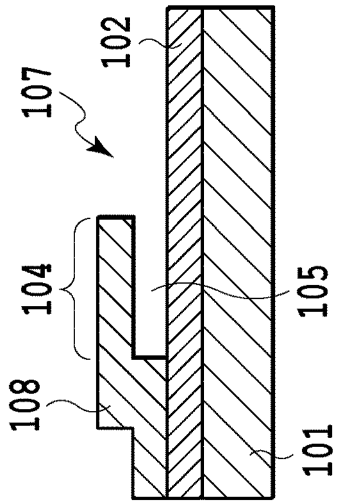
FIG. 3E is a view illustrating the process of manufacturing the joining substrate in a step-by-step order.
Figure 4:
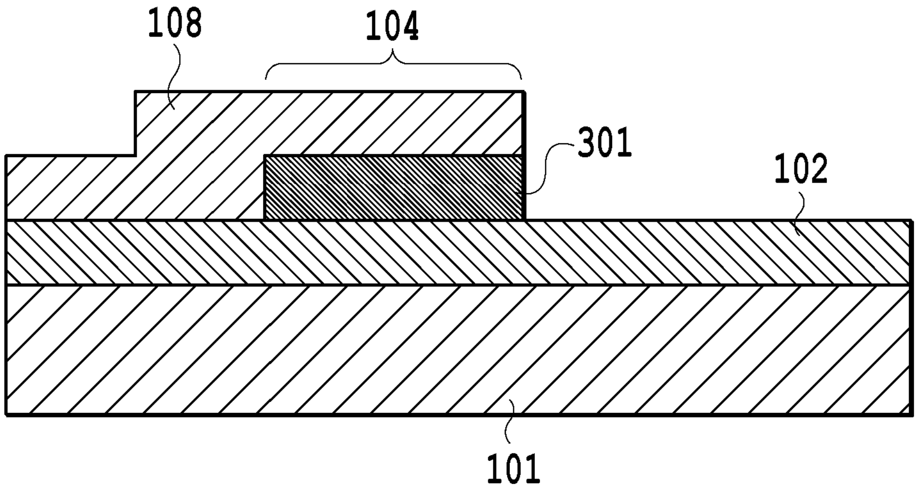
FIG. 4 is a view illustrating a comparative example in which anisotropic dry etching is used.

Then, as illustrated in FIG. 3B, the material 301 is patterned into a predetermined pattern. After the patterning, a film of the material 103 is formed as illustrated in FIG. 3C. Then, as illustrated in FIG. 3D, the film of the material 103 thus formed is patterned into a predetermined pattern. By the patterning, the eave portion 104 is formed. Lastly, as illustrated in FIG. 3E, the material 301 is removed. By removing the material 301, the structure 108 is formed, and the space 105 is formed. It is necessary to select an appropriate combination of materials and an appropriate removal method so that, in the removal of the material 301, only the material 301 will be selectively removed without damaging the surface material 102 and the material 103.

The material 301 is what is called a sacrificial layer that will be removed in a subsequent step. The material 301 may be TiW, W, Cr, or the like in a case of using the combination of the surface material 102 and the material 103 described above. Al or SiO can be a candidate of the material 301 in a case where neither the surface material 102 or the structure 108 is Al nor SiO. Wet etching or isotropic dry etching is used for the removal of these materials. This is because, in a case where anisotropic dry etching is used, the material 301 will remain in the portion where the material 301 and the material 103 overlap each other as illustrated in FIG. 4, and an eave shape cannot be obtained.

The film thickness of the material 301 determines the height of the space 105 as a groove for the organic resin material 106 to get in. In a case where the film thickness is too small, the space 105 formed by the eave portion 104 will not function as a space to hold the organic resin material 106 nor as a stopper in the etching of the material 103. On the other hand, in a case where the film thickness is too large, a step that is not negligible in the joining of the joining substrate 107 and the second substrate 201 will be formed, thus requiring a measure such as increasing the film thickness of the organic resin material 106. This contradicts the purpose of reducing the degree to which the organic resin material 106 sticks out. Thus, it is realistically desirable that the film thickness of the material 301 be set in the range of about 20 nm to 1 μm.

The film thickness of the material 103 should not be too large either in consideration of the step in the joining. In a case where the film thickness is too small, it is likely that the material 103 will fail to maintain the eave structure and get attached to the substrate by surface tension when the organic resin material 106 gets into the space 105. Thus, the film thickness of the material 103 is desirably set in the range of about 20 nm to 1 μm.

In a case where the length of the eave portion 104 is too short, the eave portion 104 does not function as a portion to hold the organic resin material 106. Conversely, in a case where the tip of the eave portion 104 is positioned so far that a portion of the organic resin material 106 sticking out cannot reach the tip, it is meaningless. Thus, the overhang length of the eave portion 104 is desirably set to a predetermined length taking the viscosity and amount of the organic resin material 106 into account. It is realistically desirable to set the length of the eave portion 104 to about 0.5 μm to 10 μm.

The ratio of the material 301 and the material 103 in film thickness is such that, in a case where the functionality of the material 301 as a stopper in the etching of the material 103 is high, the film thickness of the material 103 can be increased accordingly. However, considering the usage in the present case, there is no particular advantage in making the material 103 thick as long as the thickness is within such a range as to be able to maintain the strength of the eave portion 104. It is realistically desirable that the ratio of the film thickness of the material 103 to the film thickness of the material 301 be set in the range of about 0.2 to 5.

As a result of a process as described above, the joining substrate 107 is formed.

In the present embodiment, an organic resin material is used as a joining material. However, the material is not limited to this organic resin material, and only needs to be a joining material in the form of a viscous liquid.

As described above, a structure including an eave portion having an overhang with a predetermined length is provided on a predetermined surface of a first substrate so as to form a space between the structure and the predetermined surface, and a resin is filled in at least part of the space. In this way, it is possible to provide a laminated substrate, a liquid ejection head, and a method of manufacturing a laminated substrate which are capable of preventing a decrease in the yield of a manufacturing process due to the substrate getting broken and an organic resin material sticking out.

Example

An example will be described below with reference to drawings.

Figure 5B:
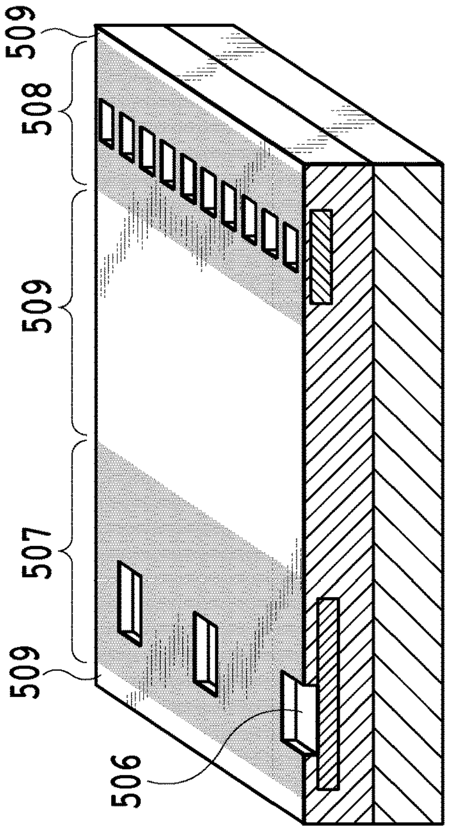
FIG. 5B is a perspective view illustrating the substrate to be used in a liquid ejection head.
Figure 5A:
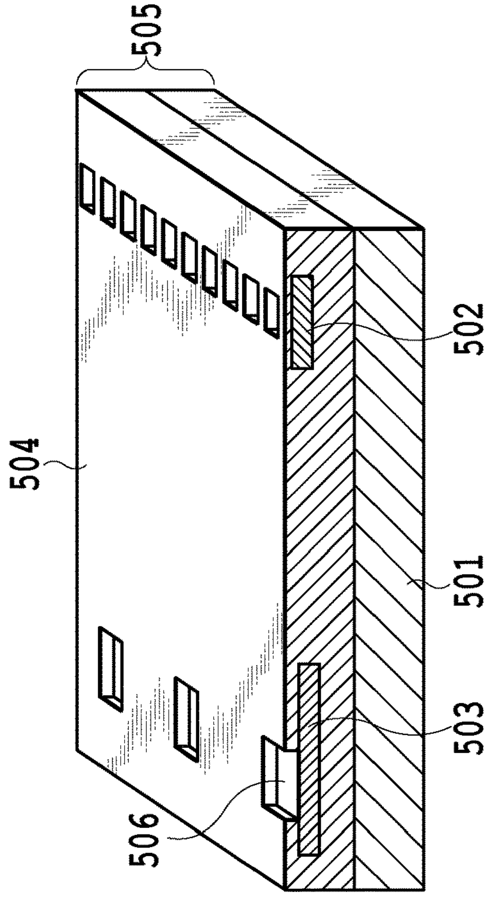
FIG. 5A is a perspective view illustrating a substrate to be used in a liquid ejection head.

FIGS. 5A and 5B are perspective views illustrating a substrate 505 to be used in a liquid ejection head. As illustrated in FIG. 5A, the substrate 505 includes a silicon substrate 501 and a wiring forming layer 504 formed on the silicon substrate 501, the wiring forming layer 504 including ejection energy generation elements 502 and wirings 503. The material of the wirings 503 is Al. The material of the outermost surface of the wiring forming layer 504 is SiN. The material of the outermost surfaces of the ejection energy generation elements 502 is Ta. These three materials correspond to the substrate surface material 102 in FIG. 1.

FIG. 5B is a view illustrating regions on the front surface of the substrate 505. A region 507 is a region where Al wiring lead-out openings 506 for forming electrodes later are present. A region 508 is a region where liquid channels are to be formed later. A joining region 509 is a region which serves as a joining part in a case of joining another substrate in a subsequent step. The joining region 509 is formed across the wirings 503 connecting the ejection energy generation elements 502 and the Al wiring lead-out openings 506 (illustration of the wirings' middle portions is omitted in FIGS. 5A and 5B). Since the wirings 503 are formed densely, it is difficult to form clearance grooves on the substrate 505 side as in the conventional method.

Figure 6A:
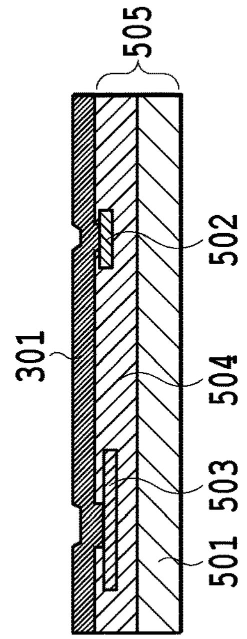
FIG. 6A is a view illustrating a method of manufacturing a liquid ejection head in a step-by-step order.
Figure 6B:
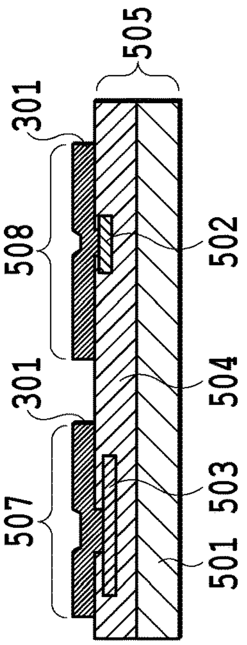
FIG. 6B is a view illustrating the method of manufacturing a liquid ejection head in a step-by-step order.

FIGS. 6A to 6G and FIGS. 7A1 to 7B2 are views illustrating a method of manufacturing a liquid ejection head in a step-by-step order. The method of manufacturing a liquid ejection head will be described below in a step-by-step order. First, as illustrated in FIG. 6A, a film of TiW was formed as the material 301 on the front surface of the substrate 505 to a thickness of 50 nm (film formation). Then, as illustrated in FIG. 6B, patterning was performed with a resist (film patterning), and the TiW was etched with the resist as a mask. The TiW etching was performed using hydrogen peroxide water. Under this etching condition, it is possible to etch only the TiW without etching the Al of the wirings 503, the SiN of the outermost surface of the wiring forming layer 504, or the Ta of the outermost surfaces of the ejection energy generation elements 502. The TiW pattern thus formed matches the regions 507 and 508 in FIG. 5B.

Figure 6C:
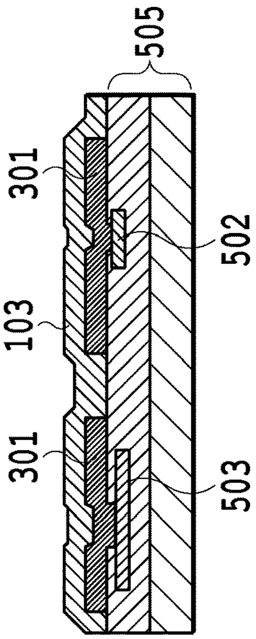
FIG. 6C is a view illustrating the method of manufacturing a liquid ejection head in a step-by-step order.
Figure 6D:
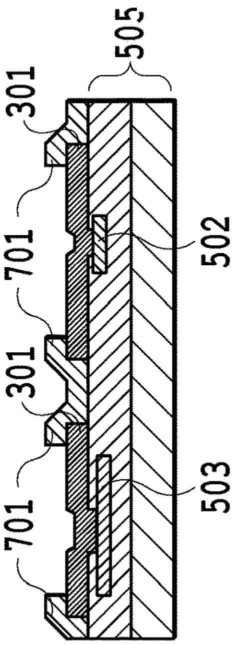
FIG. 6D is a view illustrating the method of manufacturing a liquid ejection head in a step-by-step order.

Thereafter, as illustrated in FIG. 6C, a film of SiC was formed as the material 103 to a thickness of 50 nm. Then, as illustrated in FIG. 6D, patterning was performed with a resist (not illustrated), and the SiC was etched with the resist as a mask. At this time, overlap portions 701 were formed which are portions where the TiW, or the material 301, and the SiC, or the material 103, overlapped each other. The length of each overlap portion 701 was 2 μm. The SiC etching (film etching) was dry etching using a fluorocarbon-based gas. Using the TiW as a stopper, the process was performed without having to damage the Al of the wirings 503, the SiN of the outermost surface of the wiring forming layer 504, or the Ta of the outermost surfaces of the ejection energy generation elements 502.

Figure 6E:
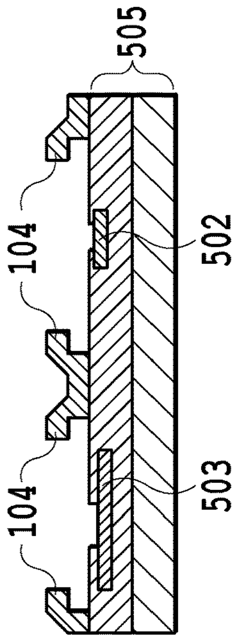
FIG. 6E is a view illustrating the method of manufacturing a liquid ejection head in a step-by-step order.
Figure 6F:
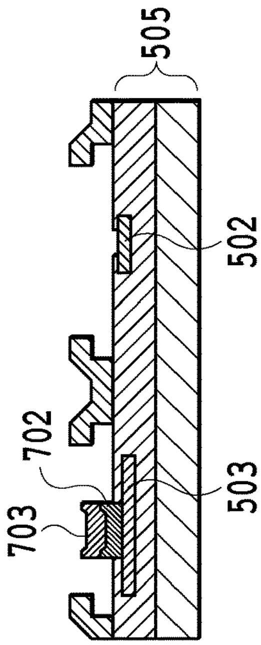
FIG. 6F is a view illustrating the method of manufacturing a liquid ejection head in a step-by-step order.

Then, as illustrated in FIG. 6E, the TiW, or the material 301, was removed by dissolution with hydrogen peroxide water. As a result, eave portions 104 were formed in the SiC, or the material 103. As mentioned earlier, the process with hydrogen peroxide water does not damage the Al of the wirings 503, the SiN of the outermost surface of the wiring forming layer 504, or the Ta of the outermost surfaces of the ejection energy generation elements 502 as mentioned above. Likewise, the process does not damage the SiC, or the material 103. Then, as illustrated in FIG. 6F, Au electrodes 703 were formed with a TiW adhesion layer 702 interposed underneath. The electrodes may be formed before FIG. 6A. Note that the overhangs of the eave portions 104 in the present example include one projecting in both one direction and the direction opposite to that one direction.

Figure 6G:
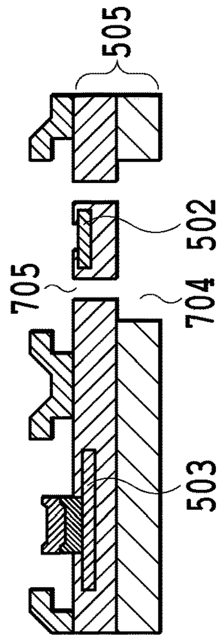
FIG. 6G is a view illustrating the method of manufacturing a liquid ejection head in a step-by-step order.

Here, in the TiW etching steps in FIGS. 6B and 6E, there is a possibility that the TiW adhesion layer 702 under the Au electrodes 703 may get etched, thereby causing detachment of the electrodes 703. It is therefore necessary to figure out such a time that the TiW under the eave portions 104 will be completely removed but the TiW adhesion layer 702 under the Au electrodes 703 will remain to such an extent as not to cause detachment of the electrodes 703. For example, in a case of removing the TiW under the 2-μm eave portions 104 as in the present example, the TiW under the electrodes 703 is horizontally etched to the same extent. Note that the horizontal dimensions of the Au electrodes usually tend to be several tens of μm to several hundreds of μm, and the amount of the above etching is relatively small. Accordingly, the electrodes 703 will not be greatly affected. Then, as illustrated in FIG. 6G, a common channel 704 and supply ports 705 were formed in the substrate 505. As a result, a first substrate 706 was formed.

Thereafter, as illustrated in FIGS. 7A1 to 7B2, a layer of the organic resin material 106 was formed on a second substrate 707 formed by processing a silicon substrate. Then, the first substrate 706 and the second substrate 707 were joined with the organic resin material 106 interposed therebetween.

FIGS. 7A1 and 7A2 illustrate a state immediately before the joining. FIG. 7A1 is a perspective view, and FIG. 7A2 is a side view. FIGS. 7B1 and 7B2 illustrate a state after the joining. FIG. 7B1 is a perspective view, and FIG. 7B2 is a side view. A material made of a benzocyclobutene resin was selected as the organic resin material 106. A liquid supply channel 708 and ejection ports 709 were formed in the second substrate 707. An example in which both the liquid supply channel 708 and the ejection ports 709 were formed has been shown above. Alternatively, only the liquid supply channel 708 may be formed before the joining, and the ejection ports 709 may be bored after the joining. Still alternatively, the second substrate 707 may be thinned down after the joining, and then the ejection ports 709 may be bored.

In the joining, the organic resin material 106 was held by a capillary force in the spaces 105 formed under the eave portions 104. As a result, the organic resin material 106 was prevented from spreading over the electrode region 507 and the liquid channel region 508.

The second substrate 707 is sometimes made as thin as about 400 μm to several tens of μm. Hence, forming clearance grooves as in the conventional method may lower the strength. However, employing the configuration of the present embodiment made it possible to prevent a decrease in yield due to the organic resin material 106 sticking out without lowering the strength of the substrate (liquid ejection chip).

The present example has shown a liquid ejection head of a type that ejects a liquid by heating it with the ejection energy generation elements 502, and a method of preparing the liquid ejection head. However, a similar method is applicable to piezoelectric liquid ejection heads.

(First Modification)

Figure 8A:
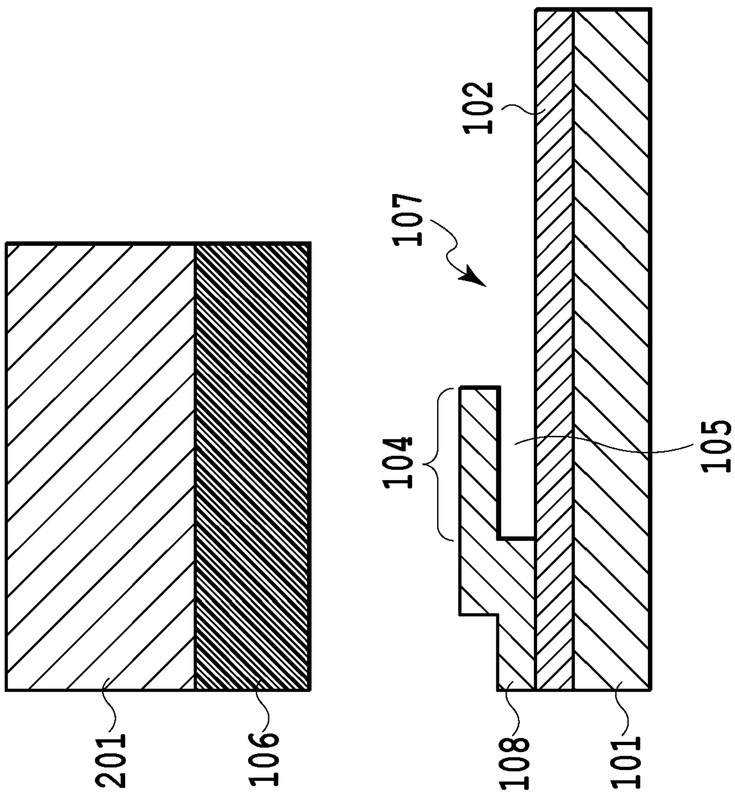
FIG. 8A is a view illustrating a first modification.
Figure 8B:
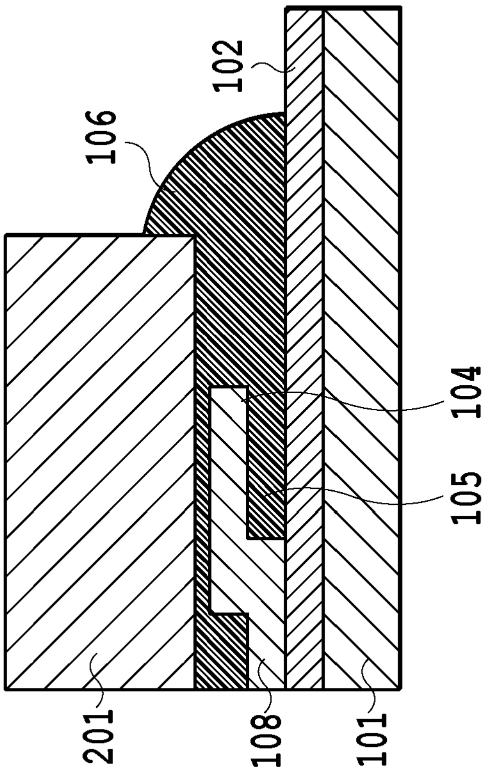
FIG. 8B is a view illustrating the first modification.

FIGS. 8A and 8B are views illustrating a first modification of the present embodiment. In the above description, an example has been described in which the structure 108 is formed at the joining portion between the joining substrate 107 and the second substrate 201 such that part of the eave portion 104 sticks out of the gap between the first substrate 101 and the second substrate 201. However, the configuration is not limited to the above and may be such that the entirety of the structure 108 fits in the gap between the first substrate 101 and the second substrate 201, as illustrated in FIG. 8.

The boundary plane of the organic resin material 106 sticking out depends on the position of the tip of the eave portion 104. Hence, it is desirable to set the position of the tip of the eave portion 104 and the length of the eave portion 104 as appropriate based on where the boundary plane of the organic resin material 106 should be positioned.

(Second Modification)

Figure 9:
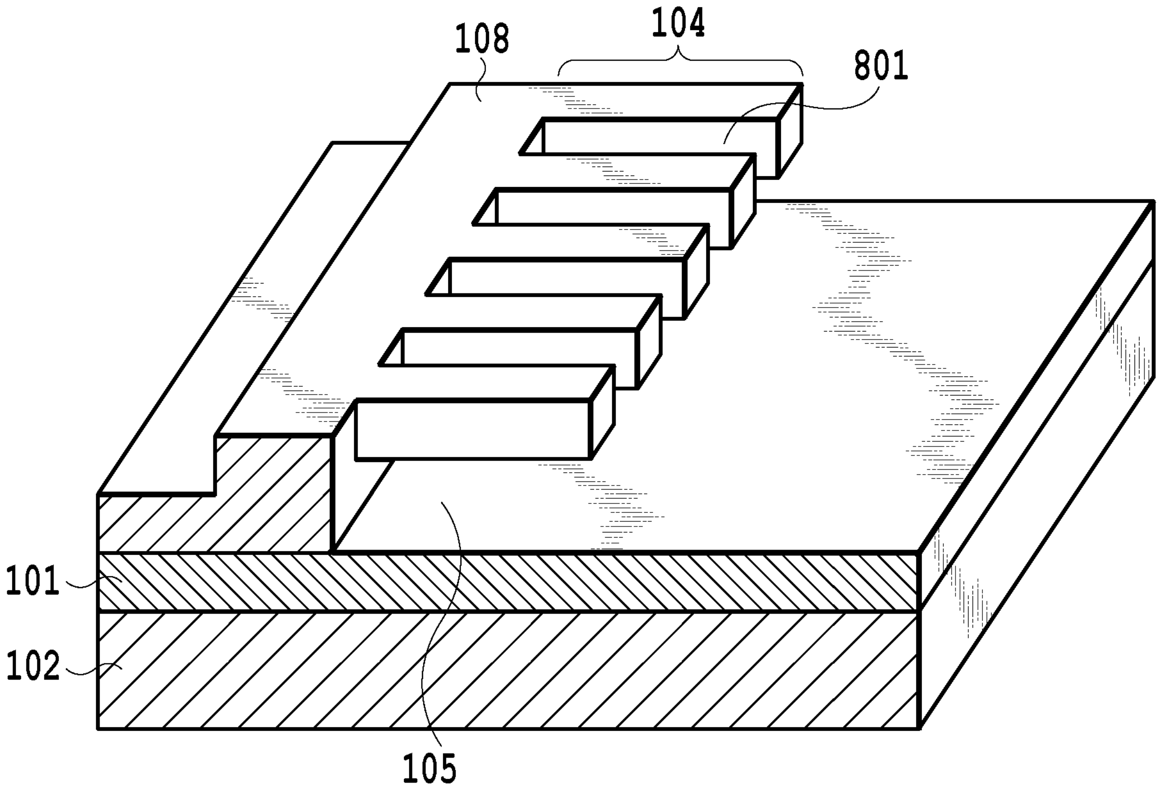
FIG. 9 is a view illustrating a second modification.

FIG. 9 is a view illustrating a second modification of the present embodiment. The structure 108 in the present modification is such that the eave portion 104 is formed in a pectinate shape, and spaces 801 are provided in the eave portion 104. With the pectinate shape, the amount of space to hold the organic resin material 106 further increases by the spaces 801. Moreover, capillary forces with the spaces 801 also act on the organic resin material 106 to efficiently get it into the space 105 and the spaces 801. Furthermore, adding the spaces 801 increases the area of contact between the organic resin material 106 and the structure 108. Accordingly, the organic resin material 106 is held by exerting a large surface free energy on the organic resin material 106 as compared to the case where the eave portion 104 is not formed in the pectinate shape.

(Third Modification)

Figure 10:
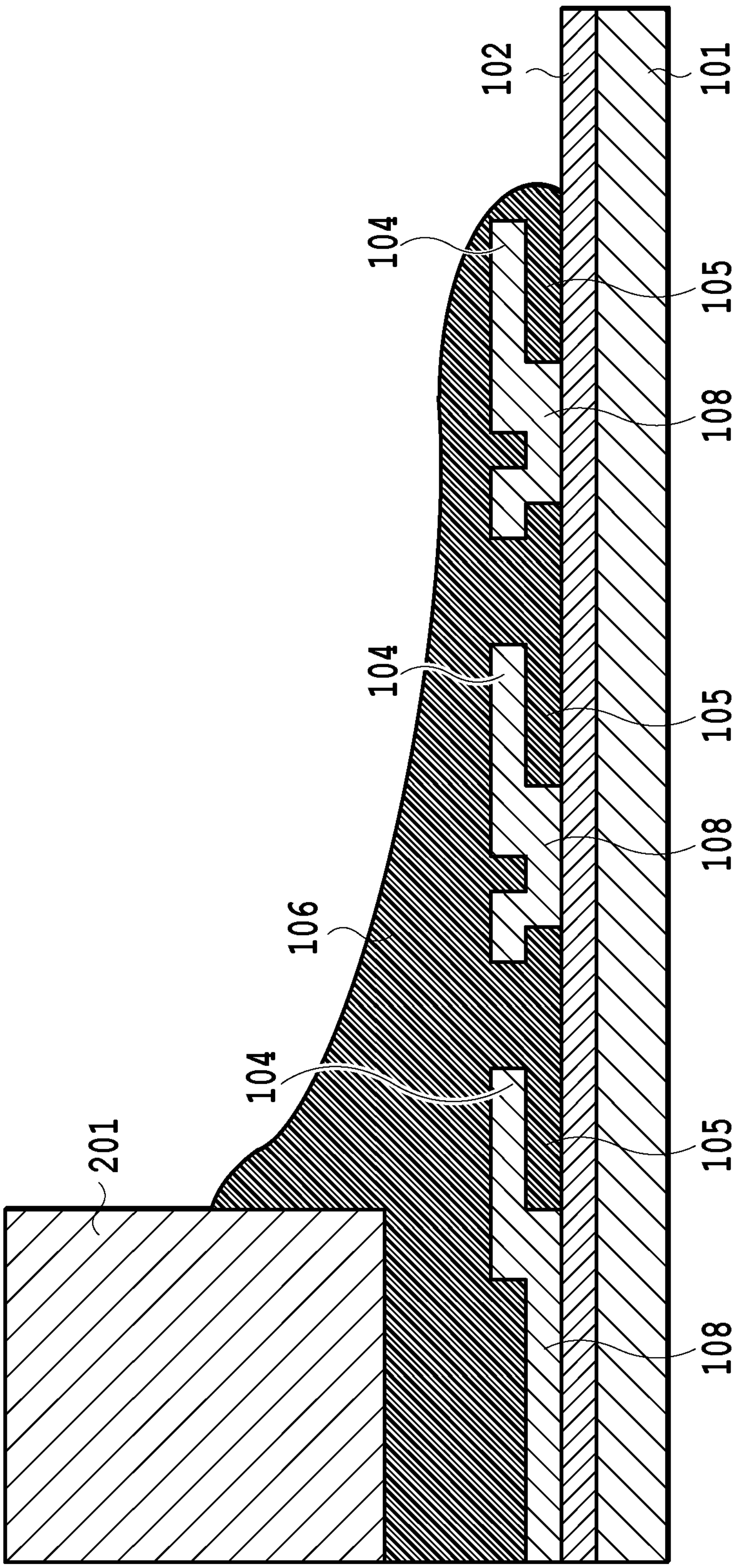
FIG. 10 is a view illustrating a third modification.

FIG. 10 is a view illustrating a third modification of the present embodiment. In the present modification, multiple (three in the present modification) structures 108 are provided in the direction in which the organic resin material 106 flows. The structures 108 in the present modification are such that the overhanging directions of the eave portions 104 includes a direction away from the part to be joined to the second substrate 201 and the direction opposite to that direction. For example, in FIG. 10, three structures 108 are formed along a direction away from the part to be joined to the second substrate 201 (the direction in which the organic resin material 106 flows out). Arranging multiple structures 108 in this manner gradually decreases the film thickness of the organic resin material 106 sticking out. Moreover, since the organic resin material 106 is held at the positions where the structures 108 are provided, the present modification is advantageous in a case of restricting the spread of the organic resin material 106 to a predetermined position.

Figure 11A:
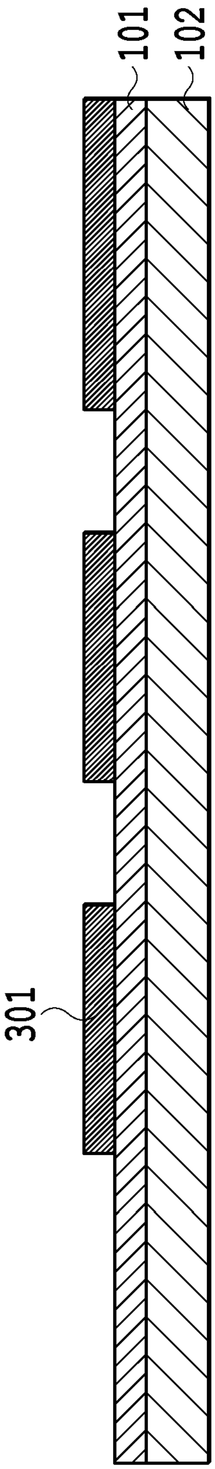
FIG. 11A is a view illustrating a method of forming structures in the third modification.
Figure 11B:
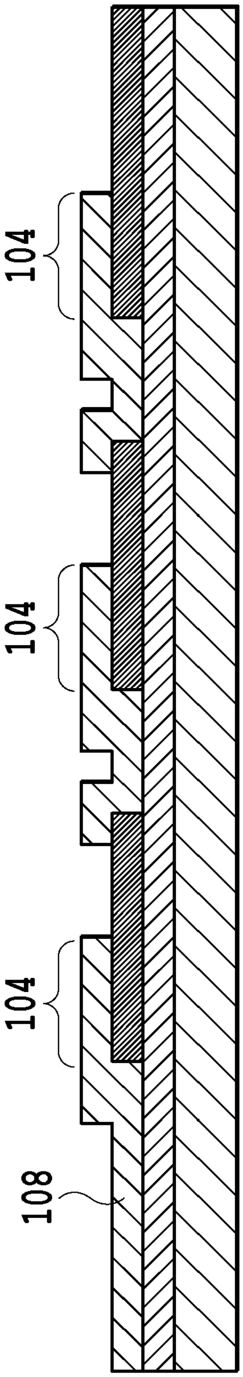
FIG. 11B is a view illustrating the method of forming structures in the third modification.

FIGS. 11A and 11B are views illustrating a method of forming the structures 108 in the third modification. The preparation method is similar to the one in the example described above (see FIGS. 6A to 7B2). The difference is that the pattern of the TiW patterning illustrated in FIG. 6B and the pattern of the SiC patterning illustrated in FIG. 6D are changed. FIGS. 11A and 11B each illustrate enlarged pattern images of these at the positions of the three eave portions. FIG. 6B and FIG. 11A correspond to each other, and FIG. 6D and FIG. 11B correspond to each other. In this manner, a joining substrate 107 including multiple structures 108 can be formed.

The examples described above may be implemented in combination as appropriate.

In the present embodiment, an example in which the organic resin material 106 is used for joining has been described. However, the application is not limited to the above, and the present invention can be used in a wide range of applications, such as sealing with an organic resin material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-194826 filed Dec. 6, 2022, which is hereby incorporated by reference wherein in its entirety.

What is claimed is:

1. A laminated substrate comprising:

a first substrate having a predetermined surface;

a structure including an eave portion having an overhang with a predetermined length provided on the predetermined surface so as to form a space between the structure and the predetermined surface;

a resin provided on a side of the structure opposite to the first substrate; and a second substrate bonded to the first substrate by the resin via the structure, wherein the resin is filled in at least part of the space.

2. The laminated substrate according to claim 1, wherein the resin is an organic resin material.

3. The laminated substrate according to claim 1, wherein part of the eave portion of the structure is out of a region between the first substrate and the second substrate.

4. The laminated substrate according to claim 1, wherein the eave portion of the structure has such a pectinate shape that comb teeth are formed on a tip side.

5. The laminated substrate according to claim 1, wherein the structure is provided in a plurality on the predetermined surface of the first substrate.

6. A laminated substrate comprising:

a first substrate having a predetermined surface;

a structure provided on the predetermined surface;

a resin provided on a side of the structure opposite to the first substrate; and a second substrate bonded to the first substrate by the resin via the structure, wherein the structure includes a holding portion to hold the resin with a capillary force, wherein the resin is filled in at least part of the holding portion.

7. A liquid ejection head comprising:

a first substrate on which part of a channel is formed, the first substrate having a predetermined surface;

a structure including an eave portion having an overhang with a predetermined length provided on the predetermined surface so as to form a space between the structure and the predetermined surface;

a resin provided on a side of the structure opposite to the first substrate; and a second substrate bonded to the first substrate by the resin via the structure, wherein the resin is filled in at least part of the space.

8. A method of manufacturing a laminated substrate comprising:

preparing a first substrate having a predetermined surface;

providing a structure including an eave portion having an overhang with a predetermined length on the predetermined surface so as to form a space between the structure and the predetermined surface;

providing a resin on a side of the structure opposite to the first substrate; and bonding the first substrate and a second substrate by the resin via the structure, wherein the step of providing the resin comprises filling the resin in at least part of the space.

9. The method according to claim 8, further comprising:

forming a film of a second material on a front surface of the first substrate; and patterning the film of the second material, wherein the providing of the structure includes:

forming a film of a first material to be the structure on the front surface of the first substrate and a front surface of the film of the second material;

patterning the film of the first material;

etching the film of the first material; and removing the film of the second material.

10. The method according to claim 9, wherein the first material is any one of SiC, SiOC, SiCN, SiOCN, TiO, TaO, HfO, or ZrO.

11. The method according to claim 9, wherein the second material is any one of TiW, W, Cr, Al, or SiO.

* * * * *